July 31, 1945. H. V. LEA ET AL 2,380,701
LEAF CUTTING ATTACHMENT FOR BEET HARVESTERS
Filed Feb. 24, 1944
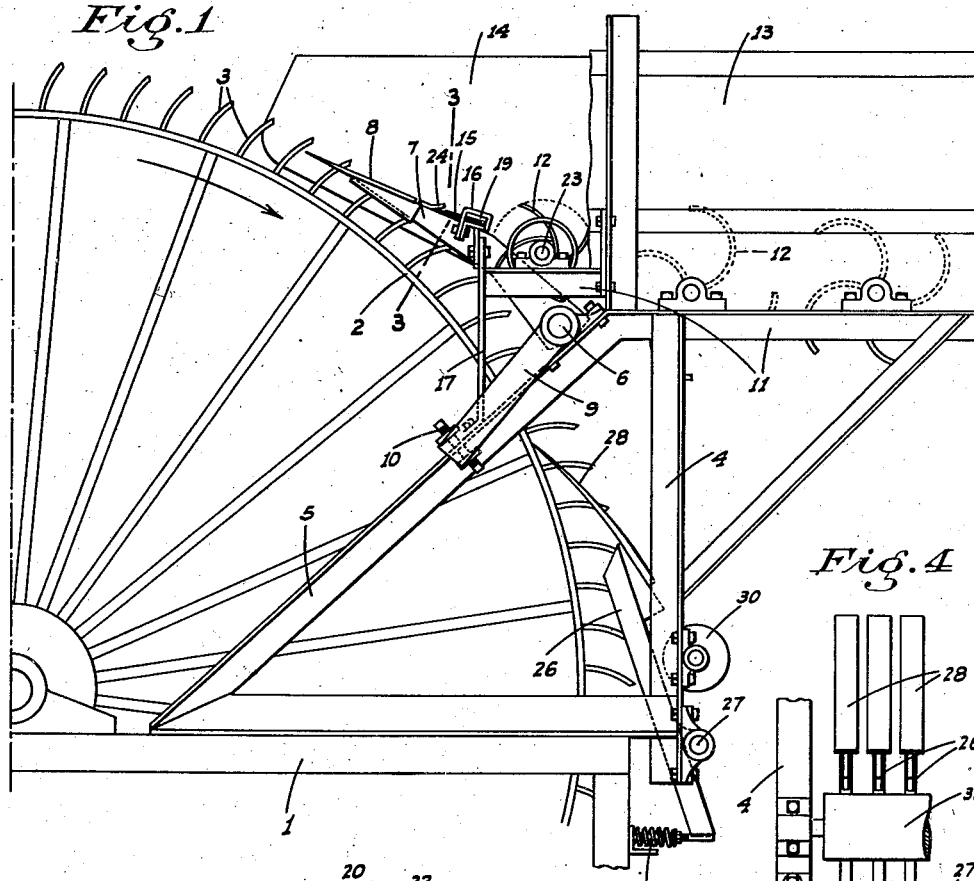
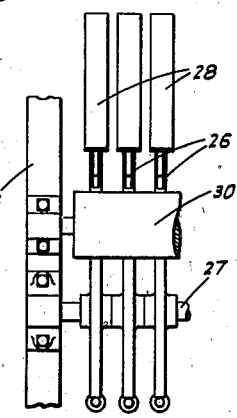
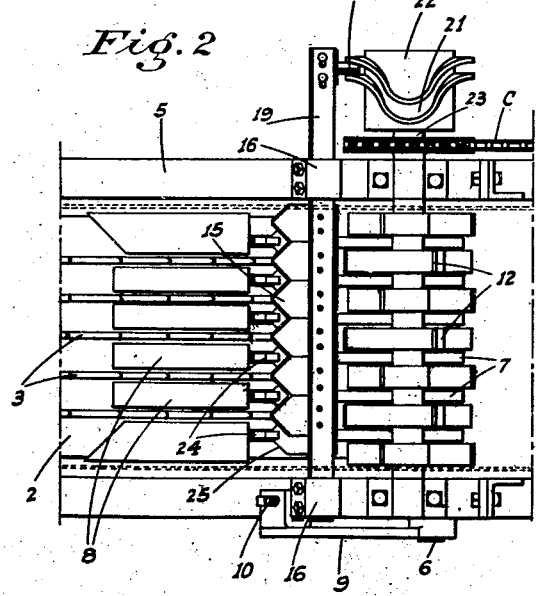
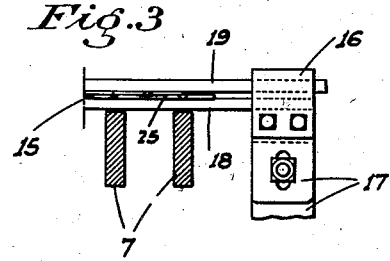
Inventors
H. V. Lea, L. W. Schmidt
Geo. P. duBose
Attorneys Patented July 31, 1945

2,380,701

UNITED STATES PATENT OFFICE 2,380,701

LEAF CUTTING ATTACHMENT FOR BEET HARVESTERS

Henry V. Lea and Lewis W. Schmidt, Rio Vista, and George P. du Bose, Stockton, Calif., assignors of twenty-one and one-fourth per cent to Claude A. Loucks, thirty-six and one-fourth per cent to Lloyd K. Schmidt, twenty-one and one-fourth per cent to Albert M. Jongeneel, and twenty-one and one-fourth per cent to said du Bose Application February 24, 1944, Serial No. 523,630

12 Claims. (Cl. 55—107)

The present invention represents improvements in beet harvesters of the type which employs a relatively large diameter, wide faced wheel having transversely spaced, circumferentially extending rows of beet pick-up spikes projecting outwardly therefrom; a beet harvester of this type being shown in copending application for U. S. patent, Serial No. 483,256, filed April 16, 1943, now U. S. Patent No. 2,350,173.

As shown in the above identified copending application, the harvester includes a beet topping unit cooperating with the spiked, beet pick-up wheel at a point above ground, and a top stripping unit cooperating with said wheel beyond the topping unit. Beets as topped are separated from the wheel, and the severed beet crowns and attached leaves continue on the wheel to the top stripping unit. However, as the topping unit comprises a plurality of transversely spaced knives which are disposed only between the rows of spikes, certain of the leaves remain connected to the topped beet when the latter is separated from the wheel. It is therefore an object of this invention to provide a cutting mechanism, in assembly with the topping unit, operative to sever any tops or leaves which remain on the beets after passing the topping unit; such cutting mechanism being a power driven sickle bar. Further, under certain conditions where any weeds exist in the beet crop, the beets as lifted are entangled with weeds, such as wire grass, wild morning glory, or water grass, which include long runners. When the beets pass through the topping unit part of the weeds tend to remain with the topped beets, while other connected parts of the weeds tend to follow the cut tops on the wheel. This produces an undesirable entangling of the weeds in the machine, and the sickle bar unit is therefore provided to sever any weed entanglement which may remain connected to the topped beets.

Another object of this invention is to provide an improved top stripping unit in cooperation with the spiked, beet pick-up wheel; such top stripping unit including a roller so disposed as to facilitate clearance or escape of stripped tops from said top stripping unit.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawing similar characters of reference indicate corresponding parts in the several views:

Figure 1 is a fragmentary side elevation of a beet harvester embodying the present invention.

Figure 2 is a fragmentary plan view showing the topping unit and sickle bar assembly.

Figure 3 is a fragmentary transverse section on line 3—3 of Fig. 1.

Figure 4 is a fragmentary transverse elevation of the top stripping unit.

Referring now more particularly to the characters of reference on the drawing, the beet harvester includes a frame 1 supported above the ground for movement therealong by a tractor (not shown) to which the harvester is connected in trailing relation; such frame having a relatively large diameter, wide faced wheel 2 journaled thereon. The wheel 2 rides the ground lengthwise of a beet row, and a plurality of transversely spaced circumferential rows of beet pickup spikes 3 are secured on and project radially out from the face of the wheel, the spikes in each row being evenly spaced apart.

A vertical supporting frame 4 is mounted on frame 1 and upstands therefrom mainly ahead of wheel 2; such frame including diagonal side braces 5. The beet topping unit is mounted on frame 4 and comprises the following:

A transverse, horizontal shaft 6 is turnably mounted on and extends between the upper end portions of braces 5 adjacent but outwardly of the spiked wheel. A plurality of rigid fingers 7 are fixed on shaft 6 and project therefrom in parallel, spaced relation to each other. The outer ends of said fingers are substantially tangent to the wheel, and are spaced so that they project between the rows of spikes 3, as clearly shown in Fig. 2. At their forward ends the fingers 7 are each fitted with a topping knife 8 which projects between the rows of teeth 3 in a circumferential plane a predetermined distance inwardly of the outer ends of the spikes. The fingers and knives are adjustably held in position by a radial lever 9 which extends lengthwise of and is adjustably secured in connection with one brace 5 by means shown at 10.

The frame 4 includes horizontal side beams 11 which rotatably support opposite ends of a plurality of horizontal, transversely extending power driven, spider rolls 12 which together form a tumbling conveyor to receive and advance beets as topped and separated from the spiked wheel 2; the spiders or fingers of the foremost roll running between the fingers 7 adjacent but above shaft 6. This tumbling conveyor separates the topped beets from earth, leaves, etc., and such beets are retained on said conveyor by side plates 13 which include wings 14 which extend alongside the topping unit at opposite ends.

A horizontal, transversely extending sickle bar unit 15 is disposed on top of the fingers 7 between the blades 8 and the foremost roll 12; such sickle bar including retaining guides 16 at opposite ends vertically adjustably mounted on the upper ends of longitudinally extensible posts 17 included in frame 4 and upstanding from braces 5. The fixed blade 18 of the sickle bar unit practically rests on fingers 7, while the reciprocating cutter bar 19 is extended beyond one end of the unit and includes a laterally projecting roller 20 riding in a closed, circumferential cam 21 formed on a drum 22 carried on an extended end portion of the shaft 23 of said foremost roll 12. As is evident, rotation of shaft 23 and cam 21 will result in reciprocating motion of the cutter bar 19. This shaft is driven, together with the rolls 12, by a chain drive C.

Upturned, rearwardly facing guards 24 are mounted on the fingers 7 in position to overhang and protect the points of the teeth 25 of the fixed blade 18, without restricting reciprocating motion of cutter bar 19.

The top stripping unit cooperates with wheel 2 beyond and below the topping unit, and comprises a plurality of fingers 26 disposed generally tangent to the wheel and pivotally mounted intermediate their ends on a cross shaft 27 secured on frame 4; such fingers being spaced to project between the rows of spikes 3. Beet top stripping chisels 28 are fixed on the fingers 26 and ride the face of the wheel between the rows of spikes; adjustable springs 29 independently urging the fingers in a direction to frictionally engage said chisels with said wheel face. The rear ends of chisels 28 terminate rearwardly of the corresponding edge of fingers 26, and a transverse, relatively small diameter roller 30 is journaled on frame 4 in beet top deflecting position below the rear ends of chisels 28, but above shaft 27.

*Operation*

With advance of the beet harvester, beets are impaled on the spiked wheel 2 in generally radiating relation with the beet crowns and leaves adjacent the wheel face, and as the wheel rotates the beets are engaged by the topping unit wherein knives 8 slice through the beets, separating the body of the beets from said crowns and leaves which in the main remain on the wheel. However, as the knives 8 are spaced apart transversely of the wheel, a small amount of leaves can pass between said knives and remain uncut by the topping unit.

As so topped, the inverted beets, with any remaining uncut leaves depending therefrom and carrying any entangled weeds, pass or fall from atop the knives 8 closely over the sickle bar unit 15, which is constantly operating, and said remaining attached leaves are cleanly cut from the topped beets by said sickle bar unit, and any weed entanglement between the topped beets and the tops on the wheel is effectively severed. The topped beets then fall onto the tumbling conveyor preparatory to discharging from the harvester into a truck moving alongside by a lateral conveyor (not shown).

The beet crowns and leaves as topped from the beets are stripped from the spiked wheel by chisels 28 and fall directly onto roller 30, from which they are deflected onto a transverse carry-off conveyor disposed therebelow, but not here shown.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In a beet harvester, a spiked, beet pick-up wheel, a topping unit cooperating with the wheel including a plurality of topping elements disposed in side by side relation and generally tangent to the wheel, and a power driven sickle bar unit extending transversely across and immediately adjacent said elements short of the forward ends thereof.

2. In a beet harvester, a spiked, beet pick-up wheel, a topping unit cooperating with the wheel including a plurality of topping elements disposed in side by side relation and generally tangent to the wheel, and a power driven sickle bar unit extending transversely across and immediately adjacent said elements short of the forward ends thereof; said topping elements being transversely spaced, and the sickle bar unit having relatively movable toothed blades disposed in forwardly facing cooperating relation.

3. In a beet harvester, a spiked, beet pick-up wheel, a topping unit cooperating with the wheel including a plurality of topping elements disposed in side by side relation and generally tangent to the wheel, said elements being spaced apart transversely and mounted for radial adjustment as a unit relative to the wheel, a forwardly facing, power driven sickle bar unit extending closely and transversely over the topping unit intermediate the ends of said elements, and means mounting the sickle bar unit for radial adjustment relative to the wheel.

4. A beet harvester as in claim 3 in which said sickle bar mounting means comprises vertically adjustable posts supporting said unit at the ends.

5. In a beet harvester, beet supporting and conveying mechanism, a topping unit cooperating with the mechanism operative to top and release beets moving on said mechanism, a carry-off conveyor onto which topped beets fall from the topping unit when released, said carry-off conveyor having a driven shaft disposed adjacent the topping unit, a sickle bar unit extending across and immediately adjacent said topping unit, and drive means between the shaft and sickle bar unit arranged to actuate the latter.

6. In a beet harvester, a beet supporting and conveying mechanism, a topping unit cooperating with the mechanism operative to top and release beets moving on said mechanism, a carry-off conveyor onto which topped beets fall from the topping unit when released, said carry-off conveyor having a driven shaft disposed adjacent the topping unit, a sickle bar unit extending across and immediately adjacent said topping unit, and drive means between the shaft and sickle bar unit arranged to actuate the latter; said drive means comprising an endless circumferential cam formed on one end of the shaft, the sickle bar unit including a reciprocating cutter bar extended into the radial plane of said cam, and an element on the cutter bar riding said cam.

7. A structure as in claim 6 in which the cam is of closed type and said element on the cutter bar comprising a roller projecting into said cam.

8. In a beet harvester which includes a spiked beet pick-up wheel, a topping unit cooperating with said wheel above ground, beets as topped by said unit being separated from the wheel, and a beet carry-off conveyor disposed adjacent said topping unit in beet receiving position, said carry-off conveyor including a shaft disposed adjacent the topping unit transversely of the wheel, a sickle bar unit extending across the topping unit close thereto, and means to drive the cutter bar unit from said shaft.

9. In a beet harvester, a spiked, beet pick-up wheel, a power driven sickle bar unit mounted in intersecting relation to the wheel face adjacent but outwardly of the spikes, and a topping unit cooperating with the wheel immediately ahead of said sickle bar unit whereby as topped the beets pass closely over said sickle bar unit.

10. In a beet harvester, a spiked, beet pick-up wheel, a topping unit cooperating with the wheel above ground, and a top stripping unit cooperating with the wheel beyond the topping unit, said top stripping unit including a plurality of transversely spaced top stripping blades riding the wheel and extending therefrom at an outward and downward slope, and a horizontal transversely extending roller mounted below said blades in top deflecting relation.

11. In a beet harvester, a beet engaging and elevating mechanism, a beet topping unit cooperating with the elevating mechanism in beet topping relation at a predetermined point above ground, the beets traversing a predetermined path beyond said topping unit, and power actuated leaf and vine cutting means mounted adjacent said path in working relation to beets traversing the same; the beets being individually releasably held on the elevating mechanism ahead of the topping unit and when topped by said unit being released to traverse said path, the cutting means being a power driven cutter bar unit extending transversely of said path.

12. In a beet harvester, a spiked, beet pick-up wheel, a beet topping unit cooperating with the wheel in beet topping relation at a predetermined point above the ground, the beets traversing a predetermined path beyond said topping unit, and power actuated leaf and vine cutting means mounted adjacent said path in working relation to beets traversing the same; said cutting means comprising a power driven sickle bar unit mounted adjacent the topping unit and transversely of said wheel, beets as topped passing crown-end over and close to said sickle bar unit.

HENRY V. LEA.
LEWIS W. SCHMIDT.
GEORGE P. DU BOSE.